(12) United States Patent
Güth et al.

(10) Patent No.: US 11,236,789 B2
(45) Date of Patent: Feb. 1, 2022

(54) METHOD AND DEVICE FOR OPERATING A DRIVETRAIN

(71) Applicant: GKN Automotive Ltd., Redditch (GB)

(72) Inventors: Dirk Güth, Detmold (DE); Jan Haupt, Kürten (DE)

(73) Assignee: GKN Automotive Ltd., Redditch (GB)

( * ) Notice: Subject to any disclaimer, the term of this patent is extended or adjusted under 35 U.S.C. 154(b) by 272 days.

(21) Appl. No.: 16/603,661

(22) PCT Filed: Apr. 13, 2017

(86) PCT No.: PCT/EP2017/058955
§ 371 (c)(1),
(2) Date: Oct. 8, 2019

(87) PCT Pub. No.: WO2018/188754
PCT Pub. Date: Oct. 18, 2018

(65) Prior Publication Data
US 2020/0132137 A1    Apr. 30, 2020

(51) Int. Cl.
*F16D 48/06*    (2006.01)
*B60K 1/00*    (2006.01)
(Continued)

(52) U.S. Cl.
CPC ............ *F16D 48/066* (2013.01); *B60K 1/00* (2013.01); *B60K 17/02* (2013.01); *F16D 25/123* (2013.01);
(Continued)

(58) Field of Classification Search
CPC ...... F16D 48/066; F16D 25/123; F16D 13/52; F16D 2300/021; F16D 2021/0661;
(Continued)

(56) References Cited

U.S. PATENT DOCUMENTS

2012/0217121 A1*  8/2012  Noda ............... B60K 6/48
                                                    192/113.3
2014/0216840 A1    8/2014  Osborn et al.
(Continued)

FOREIGN PATENT DOCUMENTS

DE    102010017966 A1    10/2011
EP        1550820 A2     7/2005
(Continued)

OTHER PUBLICATIONS

International Search Report and Written Opinion for PCT/EP2017/058955 dated Dec. 20, 2017 (16 pages; with English translation).
(Continued)

*Primary Examiner* — David J Hlavka
(74) *Attorney, Agent, or Firm* — Bejin Bieneman PLC

(57) ABSTRACT

A method and a device for operating a drive train of a motor vehicle are provided. The drive train includes at least a first and a second shaft, a first clutch having at least one first friction surface pairing, and an electric drive, the first and the second shaft being coupleable to one another via the at least one first friction surface pairing, wherein for cooling the first clutch, a fluid is used via which a drag torque of the first clutch is influenced after the first clutch is disengaged, the method including:
a) Rotating the first shaft and the second shaft when the first clutch is at least partially engaged;
b) Disengaging the first clutch;
c) Accelerating the first shaft by means of the electric drive and discharging the fluid from an area of the at least one first friction surface pairing;
wherein the drag torque of the first clutch is reduced by the accelerated discharge of the fluid.

11 Claims, 2 Drawing Sheets

(51) Int. Cl.
　　　*B60K 17/02*　　　(2006.01)
　　　*F16D 25/12*　　　(2006.01)
　　　B60K 17/34　　　(2006.01)
　　　F16D 13/52　　　(2006.01)

(52) U.S. Cl.
　　　CPC .............. *B60K 17/34* (2013.01); *F16D 13/52* (2013.01); *F16D 2300/021* (2013.01)

(58) Field of Classification Search
　　　CPC .. F16D 13/72; F16D 25/10; F16D 2021/0607; F16D 2021/0692; B60K 1/00; B60K 17/02; B60K 17/34; B60K 2001/001; B60K 17/3515; B60K 17/356; B60K 6/20
　　　See application file for complete search history.

(56) References Cited

U.S. PATENT DOCUMENTS

| | | | |
|---|---|---|---|
| 2017/0089452 A1* | 3/2017 | Deutsch | F16D 25/0638 |
| 2018/0238398 A1* | 8/2018 | Rippelmeyer | F16D 13/52 |

FOREIGN PATENT DOCUMENTS

| | | |
|---|---|---|
| EP | 2851227 A1 | 3/2015 |
| JP | 2015-533704 A | 11/2015 |
| JP | 2017-026137 A | 2/2017 |
| WO | 2014033137 A1 | 3/2014 |

OTHER PUBLICATIONS

JPO Office Action for Application No. JP2019555977 dated Sep. 15, 2020 (15 pages; with English translation).

\* cited by examiner

METHOD AND DEVICE FOR OPERATING A DRIVETRAIN

CROSS-REFERENCE TO RELATED APPLICATIONS

This application is a national stage of, and claims priority to, Patent Cooperation Treaty Application No. PCT/EP2017/058955, filed on Apr. 13, 2017, which application is hereby incorporated herein by reference in its entirety.

BACKGROUND

A motor vehicle drive train can include at least a first shaft and a second shaft, a first clutch having at least one first friction surface pairing, and an electric drive, the first shaft and the second shaft being coupleable to one another via the at least one first friction surface pairing. For cooling the first clutch, a fluid such as hydraulic fluid is used via which a drag torque of the first clutch is influenced after the first clutch is disengaged.

In particular, the first clutch, the first shaft, and the second shaft are integral parts of a common axle of a motor vehicle, wherein a drive torque of a further drive unit (an internal combustion engine, a further electric drive, etc.) is transmittable via the first shaft to the second shaft, and via the second shaft to a first wheel of the motor vehicle.

The first clutch may in particular be individually controlled, so that the first wheel is drivable by an essentially freely settable component of the drive torque of the drive unit.

A further drive torque may be transmitted to the wheel by means of the electric drive of the first shaft. The first shaft in particular is decoupleable from the drive unit.

There is a constant need for improving drive trains of motor vehicles, e.g., to achieve a preferably free distribution of the drive torques, provided via the different drive units, to the wheels (known as torque vectoring, for example). The control of the distribution should take place as dynamically as possible.

SUMMARY

The present disclosure relates to a method and device for operating a drive train of a motor vehicle. A method for operating a drive train of a motor vehicle is disclosed, wherein the drive train includes at least a first shaft and a second shaft, a first clutch having at least one first friction surface pairing, and an electric drive. The first shaft and the second shaft are coupleable to one another via the at least one first friction surface pairing, wherein for cooling the first clutch, a fluid is used via which a drag torque of the first clutch is influenced after the first clutch is disengaged. The method includes at least the following steps:
a) Rotating the first shaft and the second shaft when the first clutch is at least partially engaged;
b) Disengaging the first clutch;
c) Accelerating the first shaft by means of the electric drive and discharging the fluid from the area of the at least one first friction surface pairing;
wherein the drag torque of the first clutch is reduced by the accelerated discharge of the fluid.

It has been found that immediately after the first clutch is disengaged, a drag torque is present that decreases over time. This drag torque is influenced by the fluid which is provided for cooling the first clutch, and which after the disengagement is present between at least the first pair of friction surfaces. However, this drag torque influences the drive torque that is transmitted to the first wheel, so that it is more difficult to regulate the drive torque that is to be transmitted to the first wheel. It has been determined in particular that this drag torque, in particular at low travel speeds of the motor vehicle, decreases only slowly or has a high value.

The method is designed in particular so that the fluid is removed as quickly as possible from the clutch, or at least from the area of the first friction surface pairing. This may be achieved by accelerating the first shaft immediately after disengaging the clutch (i.e., when the first friction surface pairing is released). Due to the increase in the rotational speed of the first shaft, in particular a (higher) centrifugal force is transmitted to the fluid, as the result of which the fluid is at least partially removed more quickly, at least from the area of the first friction surface pairing.

The accelerated discharge of the fluid, at least from the area of the first friction surface pairing, may result in the drag torque at the first friction surface pairing being decreased in an accelerated manner. Thus, quicker individual regulation, independent of other influences, of the drive torque transmitted to the first wheel is possible.

In particular, at least the first shaft has a first rotational speed in step a) and immediately prior to step b), wherein in step c) the first shaft is accelerated by the electric drive to a second rotational speed that is greater than the first rotational speed, in particular at least 100 revolutions per minute, possibly at least 500 revolutions per minute, particularly possibly at least 750 revolutions per minute, greater than the first rotational speed. The second rotational speed may in particular be at least 1500 revolutions per minute greater than the first rotational speed.

In particular, the rotational speed of the second shaft is not (significantly) influenced by increasing the first rotational speed of the first shaft.

In step c) the first shaft is possibly accelerated over a time period of at least 0.1 second, in particular at least 0.3 seconds, possibly at least 0.5 second. "Acceleration" means in particular that the first rotational speed is continuously increased within the time period. Afterward, the electric drive is possibly switched off, or does not transmit its own drive torque to the first shaft.

In particular, following the acceleration the first shaft is held at an increased rotational speed over a time period of at least 0.1 second, in particular at least 0.3 seconds, possibly at least 0.5 second. At the end or after this time period elapses, the electric drive is possibly switched off, or does not transmit its own drive torque to the first shaft.

In step c) the first shaft may be accelerated over a time period of at most 2.0 seconds, in particular at most 1.0 second, possibly at most 0.5 second.

In particular, following the acceleration the first shaft is held at an increased rotational speed over a time period of at most 2.0 seconds, in particular at most 1.0 second, possibly at most 0.5 second.

The drive train may (additionally) have a third shaft and a second clutch having at least one second friction surface pairing. The first shaft and the third shaft are coupleable to one another via the at least one second friction surface pairing. For cooling the second clutch, a fluid is used via which a drag torque of the second clutch is influenced after the second clutch is disengaged. In step b) the second clutch is disengaged (in particular at the same time as the first clutch), wherein in step c) the fluid is discharged from the area of the at least one second friction surface pairing.

In particular, the operations of steps b) and c) with regard to the second clutch and the third shaft take place simultaneously with the operations at the first clutch and the second shaft. It is possibly not important whether the second clutch is in the disengaged or the engaged state prior to step b). In particular, according to step a) and immediately prior to step b), the first shaft and the third shaft rotate with an at least partially engaged second clutch.

In particular, step c) takes place only when a first rotational speed of the first shaft immediately prior to step b) is at most 2500 revolutions per minute, in particular at most 2000 revolutions per minute, possibly at most 1500 revolutions per minute.

The accelerated discharge of the fluid, at least from the areas of the first or second friction pairing, is particularly effective at low rotational speeds of the first shaft. Therefore, the method finds application possibly or solely for ranges up to this maximum rotational speed of the first shaft.

In particular, the drive train has a further drive unit (for example, an internal combustion engine, a further electric drive, etc.), wherein a drive torque of the drive unit is transmittable via the first shaft at least to the second shaft, and via the second shaft to a first wheel of the motor vehicle, wherein the further drive unit is decoupled from the first shaft prior to step c).

In particular, it is possible that the first shaft is accelerated via the electric drive. A drive torque that is provided by the electric drive for accelerating the first shaft (in this time segment) is not provided for driving the wheels of the motor vehicle. In addition, the first shaft is decoupled from as many other components of the drive train as possible, so that control of the first shaft may take place that is possibly rapid with low electrical power requirements and low consumption of electrical energy.

In particular, it is possible that the method described herein is switchable, or is carried out only in certain or predefined driving states or operating modes. Electrical consumption (by the electric drive) may thus be minimized when a highly dynamic control of the wheels driven via the second or third shaft is not necessary or desired.

A drive train for a motor vehicle can include at least a first shaft and a second shaft, a first clutch having at least one first friction surface pairing, and an electric drive. The first shaft and the second shaft are coupleable to one another via the at least one first friction surface pairing. The drive train is configured and suited for carrying out the presently disclosed and claimed method, and can thus carry out the method. For this purpose a control unit, for example having at least one electronic memory module, may be provided, into which software is integrated which appropriately executes or specifies the method steps and/or the activation or deactivation of the components of the drive train.

In particular, the first shaft and the second shaft are integral parts of a common axle of the motor vehicle, a first wheel of the motor vehicle being connectable to the first shaft via the second shaft.

In particular, the drive train has a third shaft and a second clutch having at least one second friction surface pairing, wherein the first shaft and the third shaft are coupleable to one another via the at least one second friction surface pairing; wherein the third shaft is also an integral part of the axle, a second wheel of the motor vehicle being connectable to the first shaft via the third shaft.

The drive train possibly has a further drive unit (internal combustion engine, further electric drive, etc.), wherein a drive torque of the drive unit is transmittable via the first shaft at least to the second shaft (optionally additionally to the third shaft), and via the second shaft to a first wheel (optionally via the third shaft to a second wheel on the same axle) of the motor vehicle, the drive unit being decoupleable from the first shaft via at least a third clutch.

In particular, at least one control unit is provided that initiates and controls the carrying out of the method. In particular, the control unit may regulate in such a way that the method described herein is switchable, or is carried out only in certain driving states or operating modes.

The statements concerning the method similarly apply for the drive train, and vice versa. In this regard, technical features that have been mentioned in conjunction with the method may also be used, singly or in combination with one another, for further characterization of the drive train, and vice versa.

In particular, at least the first clutch (and optionally at least also the second clutch) is a multiplate clutch, wherein when the clutch is engaged, the friction surfaces on the plates (which are respectively situated on an outer plate carrier or on an inner plate carrier) rest against one another and transmit a drive torque. When the clutch is disengaged, the plates are spaced apart from one another, so that no drive torque is transmittable. In particular, a first plate situated on the outer plate carrier forms a friction pairing with a second plate situated on the inner plate carrier.

As a precaution, it is noted that the ordinal numbers used herein ("first," "second," "third," . . . ) are used primarily (only) to distinguish between multiple similar objects, variables, or processes; i.e., in particular no dependency and/or sequence of these objects, variables, or processes relative to one another are/is necessarily specified. If a dependency and/or sequence is necessary, this is explicitly indicated herein, or is readily apparent to those skilled in the study of the embodiment specifically described.

SUMMARY OF THE DRAWINGS

The invention and the technical field are explained in greater detail below with reference to the figures. It is pointed out that the invention is not to be construed as being limited by the illustrated exemplary embodiments. In particular, unless explicitly stated otherwise, it is also possible to extract partial aspects of the information shown in the figures and combine them with other components and findings from the present description and/or figures. Identical objects are denoted by the same reference numerals, so that explanations concerning other figures may possibly be supplementally used. The figures schematically show the following.

DESCRIPTION

Figure 1:
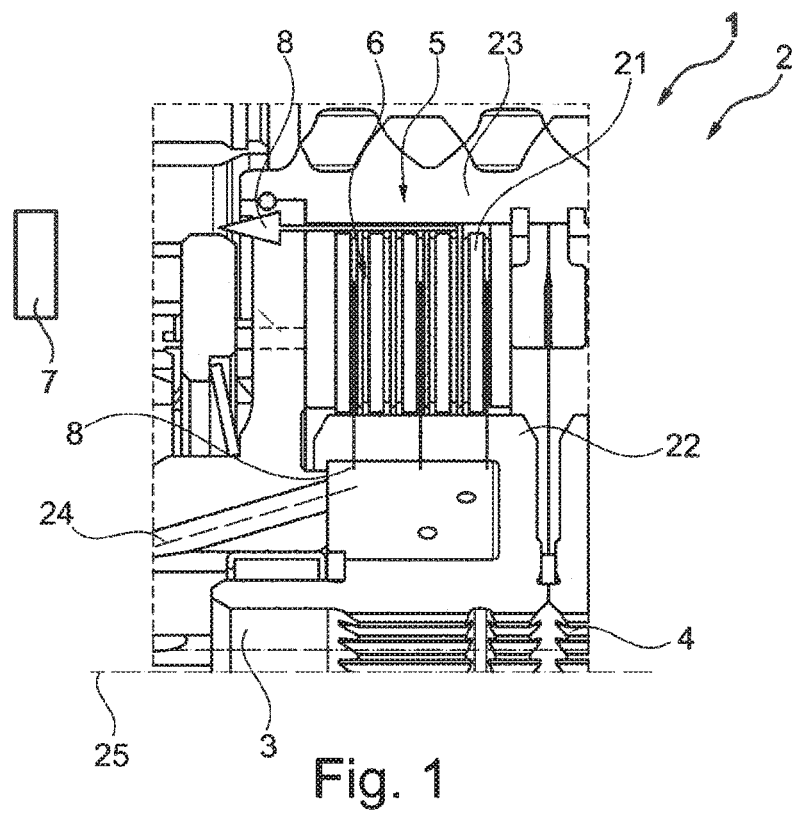
FIG. 1: shows a partial side view of a drive train in cross section.

FIG. 1 shows a partial side view of a drive train 1 in cross section. The drive train 1 includes a first shaft 3 and a second shaft 4, a first clutch 5 having first friction surface pairings 6, and an electric drive 7. The first shaft 3 and the second shaft 4 are coupleable to one another via the first friction surface pairings 6. The first clutch 5 is a multiplate clutch, wherein when the clutch 5 is engaged, the friction surfaces on the plates 21 (which are respectively situated on an outer plate carrier 23 or on an inner plate carrier 22) rest against one another and transmit a drive torque. When the first clutch 5 is disengaged, the plates 21 are spaced apart from one another, so that no drive torque is transmittable. A first plate 21 situated on the outer plate carrier 23 forms a first friction surface pairing 6 with a second plate 21 that is situated on the inner plate carrier 22, adjacent to the first plate 21. The first clutch 5 is supplied with a fluid 8 (oil, for example) via a fluid (feed) line 24 for cooling the clutch 5.

The method is directed to removing the fluid 8 as quickly as possible from the first clutch 5 or at least from the area of the first friction surface pairing 6 (i.e., the contact zone of the plates 21 with one another). This is achieved by accelerating the first shaft 3 by means of the drive 7 immediately after the first clutch 5 is disengaged (i.e., when the first friction surface pairings 6 are released by separating the plates 21 from one another). Due to the increase in the rotational speed of the first shaft 3 (from the first rotational speed 10 to a second rotational speed 11; see FIG. 2), a centrifugal force is transmitted to the fluid 8, as the result of which the fluid 8 is removed, at least partially, more quickly at least from the area of the first friction surface pairings 6.

As a result of the accelerated discharge of the fluid 8, at least from the area of the first friction surface pairings 6, the drag torque 9 (see FIG. 3) is decreased at the first friction surface pairings 6 in an accelerated manner. Thus, quicker individual regulation, independent of other influences, of the drive torque 16 transmitted to the first wheel 17 is possible (see FIG. 2).

Figure 2:
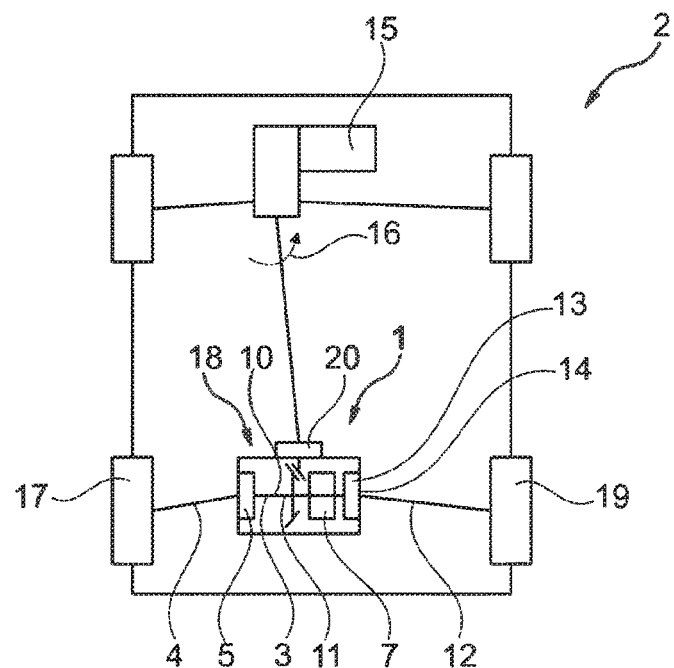
FIG. 2: shows a motor vehicle having a drive train.

FIG. 2 shows a motor vehicle 2 having a drive train 1. The motor vehicle 2 has four wheels, in each case two wheels being situated on a common axle. The drive train 1 has a drive unit 15 (internal combustion engine, further electric drive, etc.), wherein a drive torque 16 of the drive unit 15 (divided as necessary) is transmittable via a third clutch to the first shaft 3, and via the first shaft 3 to the second shaft 4 and additionally to the third shaft 12, and via the second shaft 4 to a first wheel 17, and via the third shaft 12 to a second wheel 19 on the same axle 18 of the motor vehicle 2. The drive unit 15 is decoupleable from the first shaft 3 via the third clutch 20.

The first shaft 3 and the second shaft 4 are coupleable to one another via the first friction surface pairing 6, wherein for cooling the first clutch 5, a fluid 8 is used via which a drag torque 9 of the first clutch 5 is influenced after the first clutch 5 is disengaged. According to the method, in step a) the first shaft 3 and the second shaft 4 rotate when the first clutch 5 is at least partially engaged. The first clutch 5 is disengaged in step b). In step c) the first shaft 3 is accelerated by the electric drive 7, so that the fluid 8 is discharged from the area of the first friction surface pairing 6 in an accelerated manner. The drag torque 9 of the first clutch 5 is reduced due to the accelerated discharge of the fluid 8.

The first shaft 3 and the third shaft 12 are coupleable to one another via the second friction surface pairing 14 of the second clutch 13. For cooling the second clutch 13, a fluid 8 is used via which a drag torque 9 of the second clutch 13 is influenced after the second clutch 13 is disengaged. The second clutch 13 is disengaged (in particular simultaneously with the first clutch 5) in step b), wherein in step c) the fluid 8 is also discharged from the area of the second friction surface pairing 14 due to the acceleration of the first shaft 3.

Figure 3:
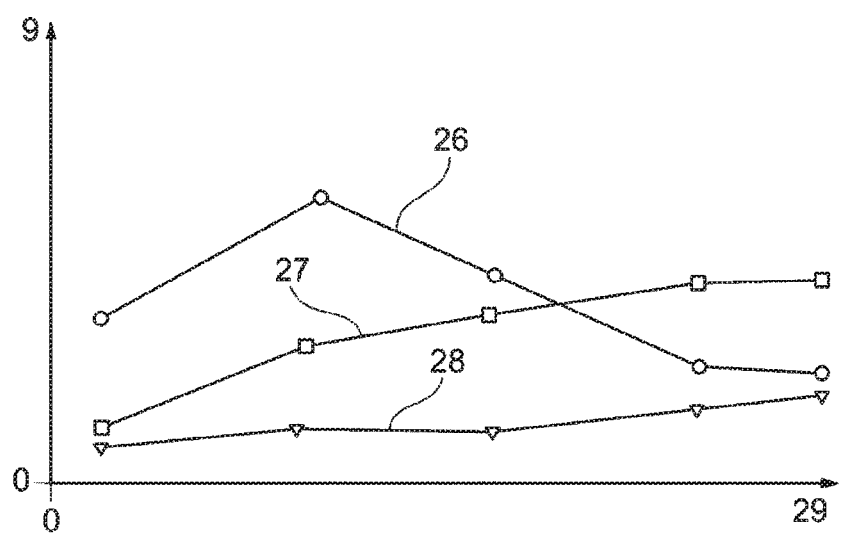
FIG. 3: shows a diagram with multiple curves of a drag torque.

FIG. 3 shows a diagram having multiple curves 26, 27, 28 of a drag torque 9. The drag torque 9 is plotted on the vertical axis. The speed 29 of the motor vehicle 2, which is proportional to the first rotational speed 10 (before the first clutch 5 is disengaged), is plotted on the horizontal axis.

Curves 26 and 28 have been determined on drive trains 1 having the same design. The second curve 27 has been determined on another known drive train 1, which also has a first shaft 3 that is drivable via an electric drive 7.

The first curve 26 shows the value of a drag torque 9 that is present on a nondriven shaft (in this case the second shaft 4, for example) shortly (approximately 0.5 second) after the clutch 5 is disengaged, for different values of the speed 29 of the motor vehicle (and for different values of the first rotational speed 10 of the first shaft 3). In the first curve 26, the first shaft 3 has not been accelerated after the first clutch 5 is disengaged.

The third curve 28 shows the value of a drag torque 9 that is present on a nondriven shaft (in this case the second shaft 4, for example) shortly (approximately 0.5 second) after the clutch 5 is disengaged, for different values of the speed 29 of the motor vehicle (and for different values of the first rotational speed 10 of the first shaft 3, prior to disengaging the first clutch 5). In the third curve 28, the first shaft 3 has been accelerated after the first clutch 5 is disengaged.

It is shown that, in particular at low speeds 29 of the vehicle 2 (i.e., at a low first rotational speed 10 of the first shaft 3), a considerable reduction in the drag torque 9 may be achieved.

The second curve 27 shows the value of a drag torque 9 that is present on a nondriven shaft (in this case the second shaft 4, for example) shortly (approximately 0.5 second) after the clutch 5 is disengaged, for different values of the speed 29 of the motor vehicle (and for different values of the first rotational speed 10 of the first shaft 3, prior to disengaging the first clutch 5). In the second curve 26 as well, the first shaft 3 has not been accelerated after the first clutch 5 is disengaged.

It is shown here that a considerable reduction (up to 60% at the highest speed 29) in the drag torque 9 may be achieved over the entire speed range, based on a comparison of the second curve 27 to the third curve 28.

LIST OF REFERENCE NUMERALS 1 drive train
2 motor vehicle
3 first shaft
4 second shaft
5 first clutch
6 first friction surface pairing
7 drive
8 fluid
9 drag torque
10 first rotational speed
11 second rotational speed
12 third shaft
13 second clutch
14 second friction surface pairing
15 drive unit
16 drive torque
17 first wheel
18 axle
19 second wheel
20 third clutch
21 plate
22 inner plate carrier
23 outer plate carrier
24 fluid line
25 rotational axis
26 first curve
27 second curve
28 third curve
29 speed

The invention claimed is:

1. A method for operating a drive train of a motor vehicle, wherein the drive train includes at least a first shaft and a second shaft, a first clutch having at least one first friction surface pairing, and an electric drive, the first shaft and the second shaft being coupleable to one another via the at least one first friction surface pairing, wherein for cooling the first clutch, a fluid is used via which a drag torque of the first clutch is influenced after the first clutch is disengaged, the method comprising:
   a) rotating the first shaft and the second shaft when the first clutch is at least partially engaged;
   b) disengaging the first clutch; and
   c) accelerating the first shaft by means of the electric drive and discharging the fluid from an area of the at least one first friction surface pairing;
   wherein the drag torque of the first clutch is reduced by an accelerated discharge of the fluid.

2. The method of claim 1, wherein at least the first shaft has a first rotational speed in step a) and immediately prior to step b), wherein in step c) the first shaft is accelerated by the electric drive to a second rotational speed that is at least 100 revolutions per minute greater than the first rotational speed.

3. The method of claim 1, wherein in step c) the first shaft is accelerated over a time period of at least 0.1 second.

4. The method of claim 1, wherein in step c) the first shaft is accelerated over a time period of at most 2.0 seconds.

5. The method of claim 1, wherein the drive train has a third shaft and a second clutch having at least one second friction surface pairing, wherein the first shaft and the third shaft are coupleable to one another via the at least one second friction surface pairing, wherein for cooling the second clutch, a fluid is used via which a drag torque of the second clutch is influenced after the second clutch is disengaged; wherein in step b) the second clutch is disengaged, and wherein in step c) the fluid is discharged from the area of the at least one second friction surface pairing.

6. The method of claim 1, wherein step c) takes place only when a first rotational speed of the first shaft immediately prior to step b) is at most 2500 revolutions per minute.

7. The method of claim 1, wherein the drive train has a further drive unit, wherein a drive torque of the drive unit is transmittable via the first shaft at least to the second shaft, and via the second shaft to a first wheel of the motor vehicle, wherein the further drive unit is decoupled from the first shaft prior to step c).

8. A drive train for a motor vehicle, comprising at least a first shaft and a second shaft, a first clutch having at least one first friction surface pairing, and an electric drive, the first shaft and the second shaft being coupleable to one another via the at least one first friction surface pairing, wherein the drive train is configured and suitable for carrying out a method that includes:
   a) rotating the first shaft and the second shaft when the first clutch is at least partially engaged;
   b) disengaging the first clutch; and
   c) accelerating the first shaft by means of the electric drive and discharging the fluid from the area of the at least one first friction surface pairing;
   wherein a drag torque of the first clutch is reduced by an accelerated discharge of the fluid.

9. The drive train of claim 8, wherein the first shaft and the second shaft are integral parts of a common axle of the motor vehicle, a first wheel of the motor vehicle being connectable to the first shaft via the second shaft.

10. The drive train of claim 9, wherein the drive train has a third shaft and a second clutch having at least one second friction surface pairing, wherein the first shaft and the third shaft are coupleable to one another via the at least one second friction surface pairing; wherein the third shaft is also an integral part of the axle, a second wheel of the motor vehicle being connectable to the first shaft via the third shaft.

11. The drive train of claim 8, further comprising a further drive unit, wherein a drive torque of the drive unit is transmittable via the first shaft at least to the second shaft, and via the second shaft to a first wheel of the motor vehicle, the drive unit being decoupleable from the first shaft via at least a third clutch.

* * * * *